United States Patent
Hama et al.

(10) Patent No.: US 8,029,033 B2
(45) Date of Patent: Oct. 4, 2011

(54) VEHICLE FRONT STRUCTURE

(75) Inventors: Daigoro Hama, Shizuoka-ken (JP); Shohei Sugimoto, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 31 days.

(21) Appl. No.: 12/545,515

(22) Filed: Aug. 21, 2009

(65) Prior Publication Data

US 2010/0078949 A1 Apr. 1, 2010

(30) Foreign Application Priority Data

Sep. 30, 2008 (JP) ................................ 2008-253455

(51) Int. Cl.
*B60R 19/02* (2006.01)
(52) U.S. Cl. ..................... 293/102; 293/121; 296/187.09
(58) Field of Classification Search ............. 296/187.09, 296/187.1, 193.09, 203.02, 30; 293/102, 293/120, 121, 133
See application file for complete search history.

(56) References Cited

U.S. PATENT DOCUMENTS

| | | | | |
|---|---|---|---|---|
| 4,333,674 | A * | 6/1982 | Buettner et al. | 293/120 |
| 4,626,011 | A * | 12/1986 | Gauthier | 293/120 |
| 6,003,912 | A * | 12/1999 | Schonhoff et al. | 293/122 |
| 6,726,261 | B2 * | 4/2004 | Goto et al. | 293/120 |
| 7,360,811 | B2 * | 4/2008 | Roll et al. | 293/133 |
| 7,641,246 | B2 * | 1/2010 | Ichikawa et al. | 293/102 |
| 7,665,778 | B2 * | 2/2010 | Henseleit | 293/102 |
| 2010/0187800 | A1 * | 7/2010 | Chen et al. | 280/785 |
| 2010/0244473 | A1 * | 9/2010 | Sugimoto et al. | 293/154 |

FOREIGN PATENT DOCUMENTS

| | | |
|---|---|---|
| DE | 101 05 562 B4 | 3/2006 |
| JP | 2002-234409 A | 8/2002 |
| JP | 2003-252134 A | 9/2003 |

* cited by examiner

*Primary Examiner* — Jason S Morrow
(74) *Attorney, Agent, or Firm* — Lerner, David, Littenberg, Krumholz & Mentlik, LLP

(57) ABSTRACT

A vehicle front structure reinforces a portion around a bumper to prevent local stress concentration. The vehicle front structure includes a first reinforcement (4) attached to the central part in the vehicle width direction of a bumper member (2), and includes second reinforcements (11) attached to the vehicle inside parts of corner parts (10) each defined by a side member (3) and the bumper member (2). The first reinforcement (4) is arranged so as to cover an upper part (2*b*) and a lower part (2*c*) of the bumper member (2). A side end part (4*b*) in the vehicle width direction of the first reinforcement (4), which is arranged in the upper part (2*b*) and the lower part (2*c*), is formed so as to extend to the outside in the vehicle width direction toward the rear of the vehicle. The second reinforcement (11) is formed into a triangular shape corresponding to the corner part (10), and has a side part (11*a*) tilting to the outside in the vehicle width direction toward the rear of vehicle so as to connect the side member (3) and the bumper member (2) with each other. The side end part (4*d*) of the first reinforcement (4) and the side part (11*a*) of the second reinforcement (11) are arranged on the same straight line.

1 Claim, 2 Drawing Sheets

VEHICLE FRONT STRUCTURE

FIELD OF THE INVENTION

The present invention relates to a vehicle front structure for reinforcing a portion around a bumper.

BACKGROUND OF THE INVENTION

A bumper provided in the front part of a vehicle is attached to a bumper member provided on a vehicle body, and this bumper member is attached to side members provided at both sides in the vehicle width direction of an engine compartment.

When the vehicle receives a load such as an impact at the vehicle front, this load is mainly received by the bumper in the front part of the vehicle. At this time, a large stress is concentrated in the central part in the vehicle width direction of the bumper, and in an attachment part between the side member and the bumper member.

Even if the impact applied to the bumper is small, the stress is concentrated especially in the central part in the vehicle width direction of the bumper member, and in an attachment part between the side member and the bumper member. At this time, at a location at which the stress is concentrated, "bending deformation" which is deformation that makes a local bend, sometimes occurs. The occurrence of "bending deformation" may cause a problem in that the strength of the vehicle front part is decreased.

To overcome this problem, various measures for reinforcing the vehicle front part have been taken. Japanese Unexamined Patent Application Publication No. 2003-252134 discloses a structure in which a reinforcing member is attached to the central part in the vehicle width direction of the bumper member. Furthermore, Japanese Unexamined Patent Application Publication No. 2002-234409 discloses a structure in which a bumper stay for reinforcement is attached to the attachment part between the side member and the bumper member.

BRIEF SUMMARY OF THE INVENTION

However, regarding the structure described in Japanese Unexamined Patent Application Publication No. 2003-252134, although the stress applied to the central part in the vehicle width direction of the bumper member is distributed, the stress is concentrated in a portion between the attachment part between the side member and the bumper member and the reinforcing member. Therefore, "bending deformation" may still occur in the attachment part between the side member and the bumper member.

Regarding the structure described in Japanese Unexamined Patent Application Publication No. 2002-234409, although the attachment part between the side member and the bumper member is strong, the stress is further concentrated in the central part in the vehicle width direction of the bumper member. Therefore, "bending deformation" may still occur in the central part in the vehicle width direction of the bumper member.

Accordingly, an object of the present invention is to provide a vehicle front structure that is reinforced so as to prevent local stress concentration.

To achieve the above object, the present invention provides a vehicle front structure including a pair of side members arranged along the vehicle front and rear direction in both right and left side parts in the vehicle width direction of an engine compartment; a bumper member which is configured so that a bumper of the vehicle can be attached thereto, and which is arranged along the vehicle width direction so as to connect the front end parts of the pair of side members with each other; a first reinforcement attached to the central part in the vehicle width direction of the bumper member; and a second reinforcement attached to a vehicle inside part of a corner part defined by the side member and the bumper member; wherein the first reinforcement is arranged so as to cover an upper part and a lower part in the vehicle vertical direction of the bumper member; wherein a side end part in the vehicle width direction of the first reinforcement, which is arranged in the upper part and the lower part, is formed so as to extend to the outside in the vehicle width direction toward the rear of vehicle; wherein the second reinforcement is formed into a triangular shape corresponding to the corner part, and has a side part tilting to the outside in the vehicle width direction toward the rear of the vehicle so as to connect the side member and the bumper member with each other; and wherein the side end part of the first reinforcement and the side part of the second reinforcement are arranged on the same straight line.

In the vehicle front structure in accordance with the present invention, the first reinforcement is formed so as to make a clearance which extends over the entirety in the vehicle width direction regarding at least one of a front part and a rear part of the bumper member.

According to the vehicle front structure in accordance with the present invention, the effect described below can be achieved. In the vehicle front structure in accordance with the present invention including the pair of side members arranged along the vehicle front and rear direction in both the right and left side parts in the vehicle width direction of the engine compartment; the bumper member which is configured so that the bumper of the vehicle can be attached thereto, and which is arranged along the vehicle width direction so as to connect the front end parts of the pair of side members with each other; the first reinforcement attached to the central part in the vehicle width direction of the bumper member; and the second reinforcement attached to the vehicle inside part of the corner part defined by the side member and the bumper member, wherein the first reinforcement is arranged so as to cover the upper part and the lower part in the vehicle vertical direction of the bumper member; wherein the side end part in the vehicle width direction of the first reinforcement, which is arranged in the upper part and the lower part, is formed so as to extend to the outside in the vehicle width direction toward the rear of the vehicle; wherein the second reinforcement is formed into a triangular shape corresponding to the corner part, and has the side part tilting to the outside in the vehicle width direction toward the rear of vehicle so as to connect the side member and the bumper member with each other; and wherein the side end part of the first reinforcement and the side part of the second reinforcement are arranged on the same straight line. Therefore, a load applied to the central part of the bumper member flows to the side member along the side end part of the first reinforcement and the side part of the second reinforcement, which are arranged on the same straight line, and this load is distributed. Furthermore, on the straight line along the side end part of the first reinforcement and the side part of the second reinforcement on the rear of the side member, usually, attachment parts of an apron side member, an extension panel, a fender apron brace, and the like, which are provided on the outside in the vehicle width direction of the side member, are arranged. Therefore, the load can be distributed to these members, so that local stress concentration in the vehicle front part can be prevented, and thereby the occurrence of deformation affecting the strength of vehicle front part, such as "bending deformation", can be reliably prevented.

In the vehicle front structure in accordance with the present invention, the first reinforcement is formed so as to make a clearance which extends over the entirety in the vehicle width direction regarding at least one of the front part and the rear part of the bumper member. By not adopting a structure that enhances in an unbalanced way only the strength of the first reinforcement, the load applied to the central part of the bumper member can be distributed to the first reinforcement and further to the bumper member. Therefore, such a load can be absorbed while being distributed along the side end part of the first reinforcement and the side part of the second reinforcement, and further being distributed in the central part of the bumper member. Furthermore, when the load applied to the central part of the bumper member is applied so that the magnitude thereof is different in the vehicle vertical direction of the bumper member, and is applied so that a twisting force is generated in the bumper member, the load can be distributed to the upper part and the lower part of the first reinforcement without the twisting of the bumper together with the rotation of the entirety of the first reinforcement by the clearance extending over the entirety in the vehicle width direction of the first reinforcement. Therefore, the local stress concentration in the vehicle front part can be prevented further efficiently, and thereby the occurrence of deformation affecting the strength of vehicle front part, such as "bending deformation", can be reliably prevented.

DETAILED DESCRIPTION OF THE INVENTION

Figure 1:
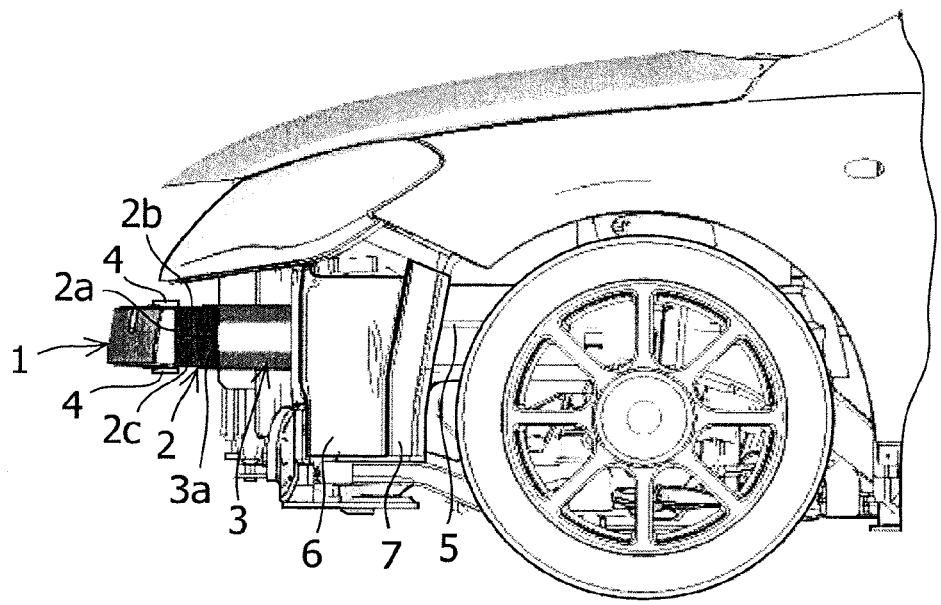
FIG. 1 is a side view schematically showing an internal structure around a bumper in a vehicle front part in an embodiment.

An embodiment of a vehicle front structure in accordance with the present invention will now be described with reference to the accompanying drawings. FIG. 1 is a side view schematically showing an internal structure around a bumper in a vehicle front part in this embodiment. In a lower portion of the vehicle front part, a bumper (absorber) 1 for buffering an impact and vibrations which are applied from the vehicle front is installed. This bumper 1 is attached to a front part 2a on the vehicle front of a bumper member 2, and further the bumper member 2 is attached to front end parts 3a on the vehicle front of side members 3. A first reinforcement 4 is installed so as to cover an upper part 2b and a lower part 2c in the vehicle vertical direction of the bumper member 2.

An apron side member 5 is attached to the rear of the side member 3, an extension panel 6 is attached to the outside in the vehicle width direction of the apron side member 5, and a fender apron brace 7 is attached to the outside in the vehicle width direction of the apron side member 5 on the rear of the extension panel 6.

Figure 2:
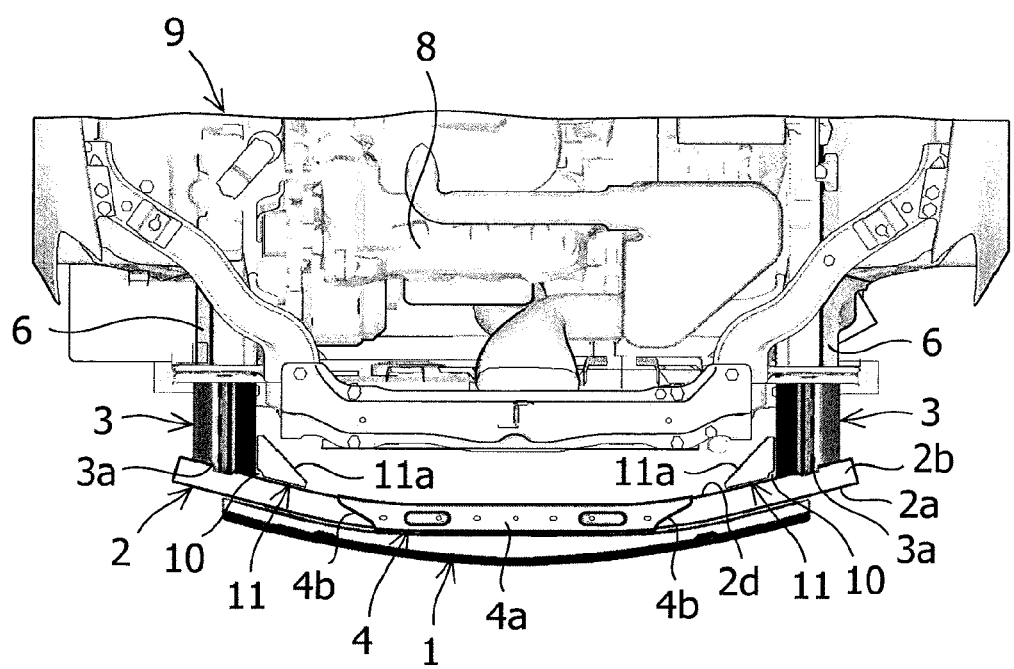
FIG. 2 is a top view schematically showing an internal structure around a bumper in a vehicle front part in an embodiment.

FIG. 2 is a top view schematically showing the internal structure around the bumper in the vehicle front part in this embodiment. In practice, the apron side member 5, the extension panel 6, and the fender apron brace 7 are provided at the right and left in the vehicle width direction.

In the front part of vehicle, an engine compartment 9 for accommodating an engine 8 is provided, and the pair of side members 3 and 3 is arranged along the vehicle front and rear direction in both right and left side parts in the vehicle width direction of the engine compartment 9. The bumper member 2 is formed so as to be curved toward the vehicle front, and is arranged along the vehicle width direction so as to connect the front end parts 3a and 3a of the paired side members 3 and 3 with each other. The bumper 1 attached to the front part 2a of the bumper member 2 is formed so as to be curved toward the vehicle front corresponding to the bumper member 2.

The first reinforcement 4 is arranged in the central part in the vehicle width direction of the bumper member 2, extends evenly to the right and left in the vehicle width direction from the center in the vehicle width direction of the bumper member 2, and is formed into a shape corresponding to the bumper member 2. The first reinforcement 4 is arranged so as to cover the upper part 2b and the lower part 2c of the bumper member 2. In the upper part 2b of the bumper member 2, an upper part 4a of the first reinforcement 4 is arranged. Side end parts 4b, 4b on both sides in the vehicle width direction of the upper part 4a are formed so as to extend to the outside in the vehicle width direction toward the rear of vehicle.

By the bumper member 2 and the paired side members 3 and 3, a pair of corner parts 10 and 10 are defined. In each of the vehicle inside parts of the paired corner parts 10 and 10, a second reinforcement 11 is installed. The second reinforcement 11 is formed in a substantially triangular shape so as to correspond to the shape of the corner part 10. The second reinforcement 11 formed into a substantially triangular shape has a side part 11a connecting the bumper member 2 and the side member 3 with each other. The side part 11a is formed so as to tilt to the outside in the vehicle width direction toward the rear of vehicle. The side end part 4b of the upper part 4a and the side part 11a of the second reinforcement 11 are arranged on the identical straight line.

Figure 3:
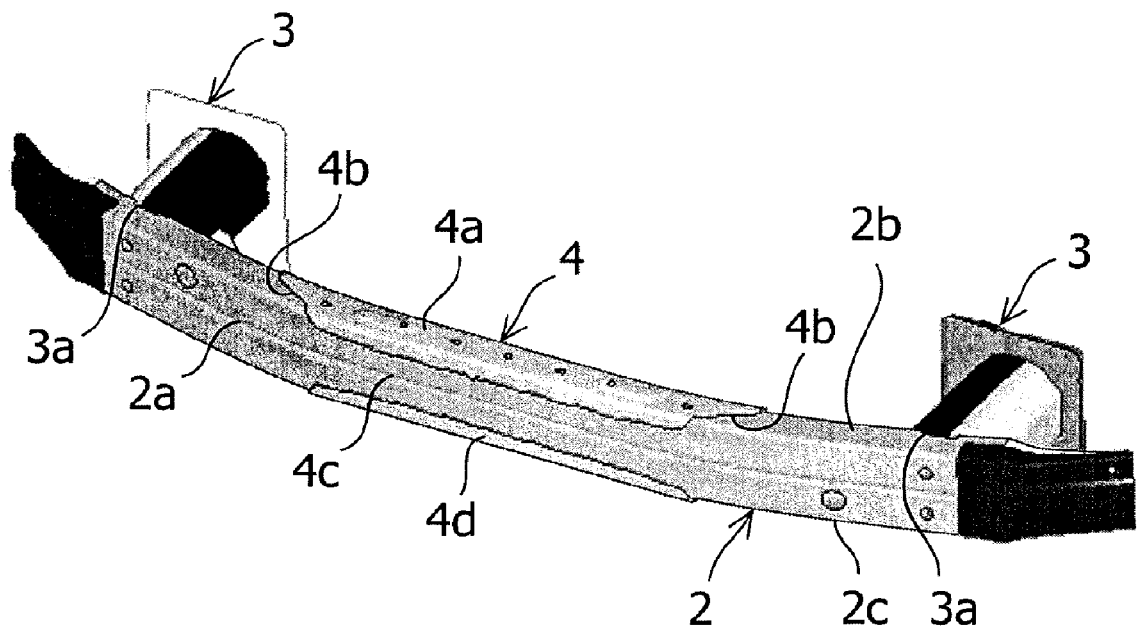
FIG. 3 is a perspective view schematically showing a structure on the vehicle front side around a bumper member in an embodiment.

FIG. 3 is a perspective view schematically showing a structure on the vehicle front side around the bumper member 2 regarding this embodiment. The first reinforcement 4 includes a front clearance 4c which extends over the entirety in the vehicle width direction in the front part 2a of the bumper member 2. The upper part 4a of the first reinforcement 4 is formed so as to be bent downward along the front part 2a of the bumper member 2 in a portion near the upper end of the front part 2a of the bumper member 2.

Furthermore, in the lower part 2c of the bumper member 2, a lower part 4d of the first reinforcement 4 is arranged. The lower part 4d of the first reinforcement 4 is formed so as to be bent upward along a rear part 2d of the bumper member 2 in a portion near the lower end of the front part 2a of the bumper member 2.

Although not shown, a side end part (not shown) of the lower part 4d of the first reinforcement 4 is also formed, like the upper part 4a, so as to extend to the outside in the vehicle width direction toward the rear of vehicle. The side end part of the lower part 4d and the side part 11a of the second reinforcement 11 are also arranged on the same straight line. On this same straight line, the apron side member 5, the extension panel 6, and the fender apron brace 7 are arranged.

Figure 4:
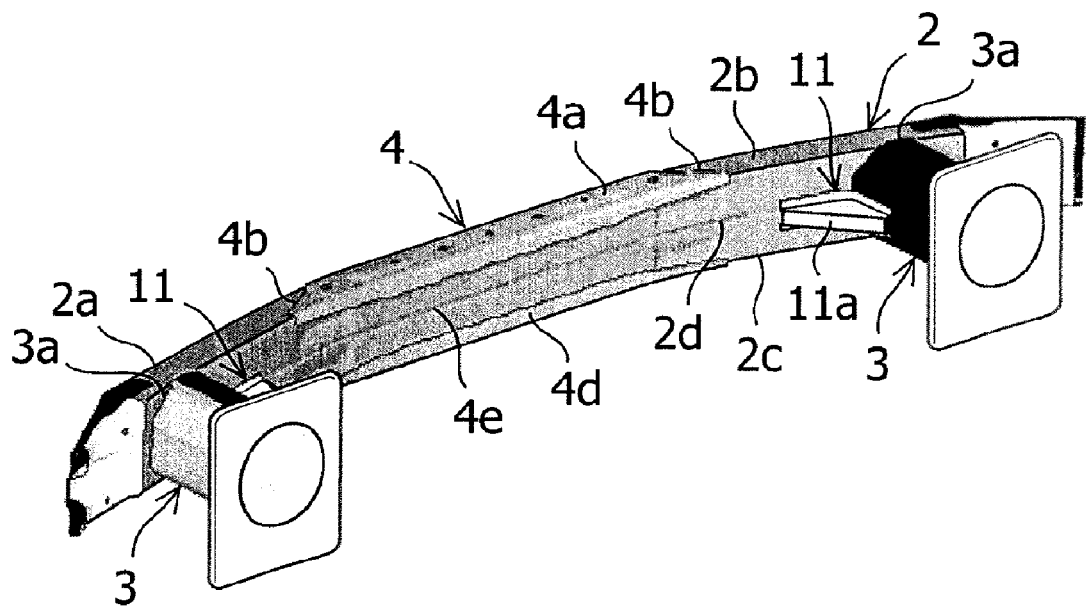
FIG. 4 is a perspective view schematically showing a structure on the vehicle rear side around a bumper member in an embodiment.

FIG. 4 is a perspective view schematically showing a structure on the vehicle rear side around the bumper member 2 regarding this embodiment. The first reinforcement 4 includes a rear clearance 4e extending over the entirety in the vehicle width direction in the rear part 2d of the bumper member 2. The upper part 4a of the first reinforcement 4 is formed so as to be bent downward along the rear part 2d of the bumper member 2 in a portion near the upper end of the rear part 2d of the bumper member 2. The lower part 4d of the first reinforcement 4 is formed so as to be bent upward along the rear part 2d of the bumper member 2 in a portion near the lower end of the rear part 2d of the bumper member 2. The second reinforcement 11 is arranged substantially in the center in the vehicle vertical direction of the corner part 10.

As described above, according to the embodiment of the present invention, a load applied to the central part of the bumper member flows to the side member 3 along the side end part 4b of the upper part 4a and the side end part of the lower part 4d of the first reinforcement 4 and the side part 11a of the second reinforcement 11, which are arranged on the same straight line, and this load is distributed. Furthermore, on the outside in the vehicle width direction of the apron side member 5 on the rear of the side member 3, attachment parts of the apron side member 5, the extension panel 6, the fender apron brace 7, and the like, which are provided on the outside in the vehicle width direction of the apron side member 5 on the rear of the side member 3, are arranged on the straight line along the side end part 4b of the first reinforcement 4 and the side part 11a of the second reinforcement 11. Therefore, the load can be distributed to these members, so that local stress concentration in the vehicle front part can be prevented, and thereby the occurrence of deformation affecting the strength of vehicle front part, such as "bending deformation", can be reliably prevented.

According to the embodiment of the present invention, a structure having enhanced in an unbalanced manner only the strength of the first reinforcement 4 is not adopted by providing the front clearance 4c and the rear clearance 4e in the first reinforcement 4. Therefore, the load applied to the central part of the bumper member 2 can be distributed to the first reinforcement 4, and further can be distributed to the bumper member 2. As a result, such a load can be absorbed while being distributed along the side end part 4b of the upper part 4a and the side end part of the lower part 4d of the first reinforcement 4 and the side part 11a of the second reinforcement 11, and further being distributed in the central part of the bumper member 2. Furthermore, when the load applied to the central part of the bumper member 2 is applied so that the magnitude thereof is different in the vehicle vertical direction of the bumper member 2, and is applied so that a twisting force is generated in the bumper member 2, such a load can be distributed to the upper part 4a and the lower part 4d of the first reinforcement 4 without the twisting of the bumper 1 together with the rotation of the entirety of the first reinforcement 4 by the front clearance 4c and the rear clearance 4e in the first reinforcement 4. Therefore, the local stress concentration in the vehicle front part can be prevented further efficiently, and thereby the occurrence of deformation affecting the strength of vehicle front part, such as "bending deformation", can be reliably prevented.

The above is a description of an embodiment of the present invention. The present invention is not limited to the above-described embodiment, and various modifications and changes can be made based on the technical concept of the present invention.

For example, as a first modification of the embodiment of the present invention, only one of the two clearances, the front clearance 4c and the rear clearance 4e, of the first reinforcement 4 may be provided. This first modification can achieve the same effect as that of the embodiment of the present invention. On the other hand, neither the front clearance 4c nor the rear clearance 4e can be provided.

As a second modification of the embodiment of the present invention, the first reinforcement 4 may be formed so as to extend unevenly to the right and left in the vehicle width direction from the center of the bumper member 2.

As a third modification of the embodiment of the present invention, the members provided on the outside in the vehicle width direction of the side member 3 may be parts other than the apron side member 5, the extension panel 6, and the fender apron brace 7. This third modification can achieve the same effects as those of the embodiment of the present invention.

What is claimed is:

1. A vehicle front structure comprising:
a pair of side members arranged along the vehicle front and rear direction in both right and left side parts in the vehicle width direction of an engine compartment;
a bumper member which is configured so that a bumper of the vehicle can be attached thereto, and which is arranged along the vehicle width direction so as to connect the front end parts of the pair of side members with each other;
a first reinforcement attached to a central part in the vehicle width direction of the bumper member; and
a second reinforcement attached to a vehicle inside part of a corner part defined by the side member and the bumper member;
wherein the first reinforcement has an upper part and a lower part, the upper part and the lower part are arranged so as to cover an upper part and a lower part in the vehicle vertical direction of the bumper member;
wherein the upper part and the lower part of the first reinforcement are arranged in the upper part and the lower part of the bumper member;
wherein a side end part in the vehicle width direction of the upper part and the lower part of the first reinforcement is formed so as to extend to the outside in the vehicle width direction toward the rear of the vehicle;
wherein the second reinforcement is formed into a triangular shape corresponding to the corner part, and has a side part tilting to the outside in the vehicle width direction toward the rear of the vehicle so as to connect the side member and the bumper member with each other;
wherein the side end part of the first reinforcement and the side part of the second reinforcement are arranged on the same straight line; and
wherein the first reinforcement forms a clearance on at least one of a front part and a rear part of the bumper member, and the clearance extends over the entirety of the first reinforcement in the vehicle width direction between the upper part and the lower part of the first reinforcement.

* * * * *